United States Patent [19]
Alroy

[11] 3,832,102
[45] Aug. 27, 1974

[54] THERMOFORMING MACHINE WITH ARTICLES TRIMMED IN-PLACE
[76] Inventor: John D. Alroy, 380 Mountain Rd., Union City, N.J. 07087
[22] Filed: Mar. 6, 1973
[21] Appl. No.: 338,554

Related U.S. Application Data
[62] Division of Ser. No. 88,805, Nov. 12, 1970, abandoned.

[52] U.S. Cl................ 425/292, 425/310, 425/383, 425/387, 425/436
[51] Int. Cl. ...................... B29c 17/04, B29c 17/08
[58] Field of Search .......... 425/384, 383, 388, 387, 425/397, 398, 413, 437, 342, 310, 135, DIG. 200, DIG. 201, 292, 361

[56] References Cited
UNITED STATES PATENTS
2,976,658  3/1961  Kostur ............................ 425/167 X
3,115,677  12/1963  Thiel .............................. 425/324 X
3,240,851  3/1966  Scalora .......................... 425/302 X
3,412,430  11/1968  Zwiebel ......................... 425/151 X
3,583,036  4/1969  Brown............................ 425/388 X
3,650,655  3/1972  Santouris....................... 425/388 X Primary Examiner—Robert L. Spicer, Jr.
Attorney, Agent, or Firm—Darby & Darby

[57] ABSTRACT

Apparatus for thermoforming plastic articles in which the articles have their edges trimmed while still being held in a mold cavity by moving the mold within a cutting die to produce a shearing cut of the plastic, the apparatus operating on a multiple basis so that an article is being formed while another is being trimmed, and an arrangement for batching the trimmed articles in groups of a predetermined amount.

9 Claims, 9 Drawing Figures

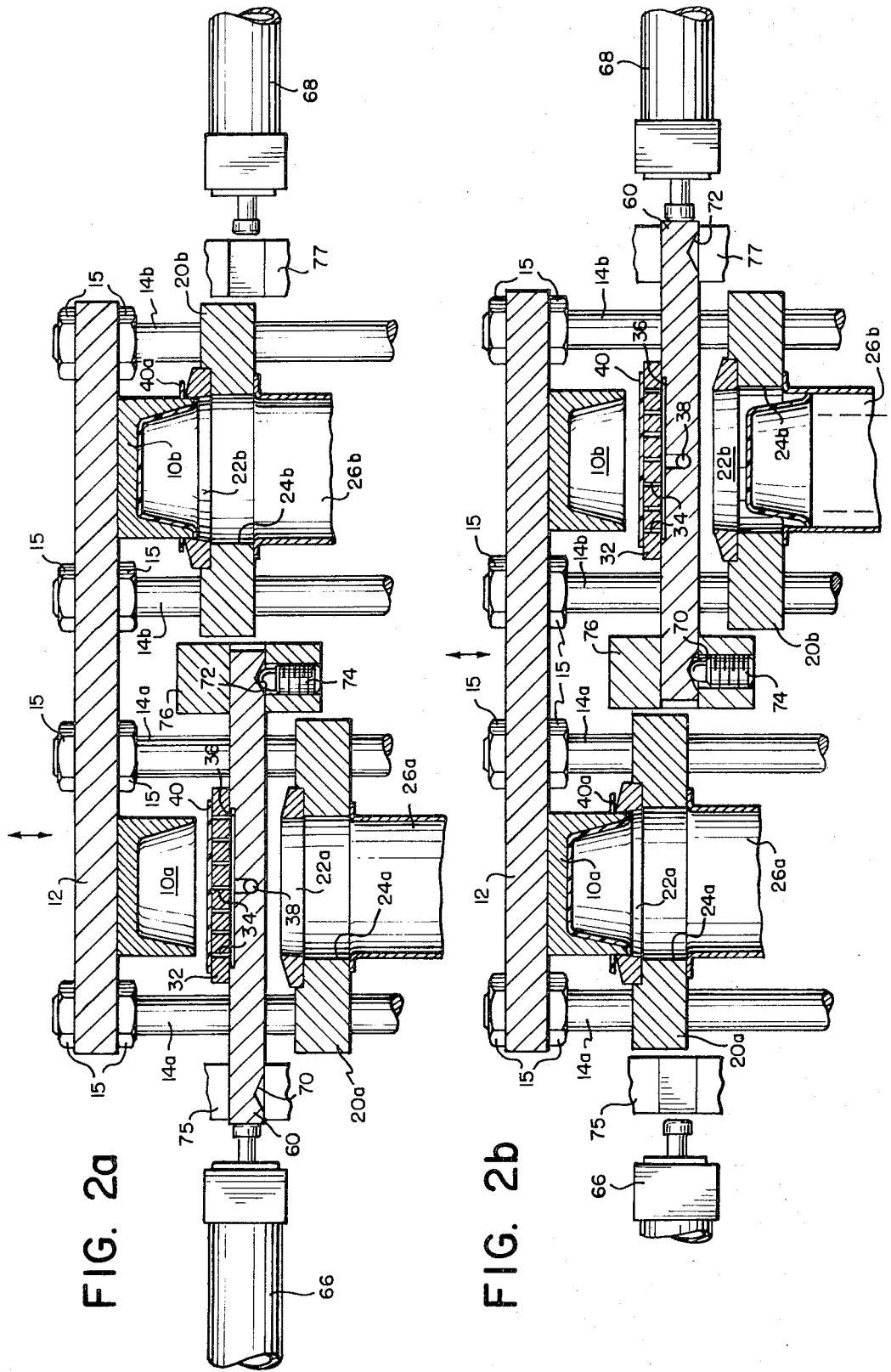

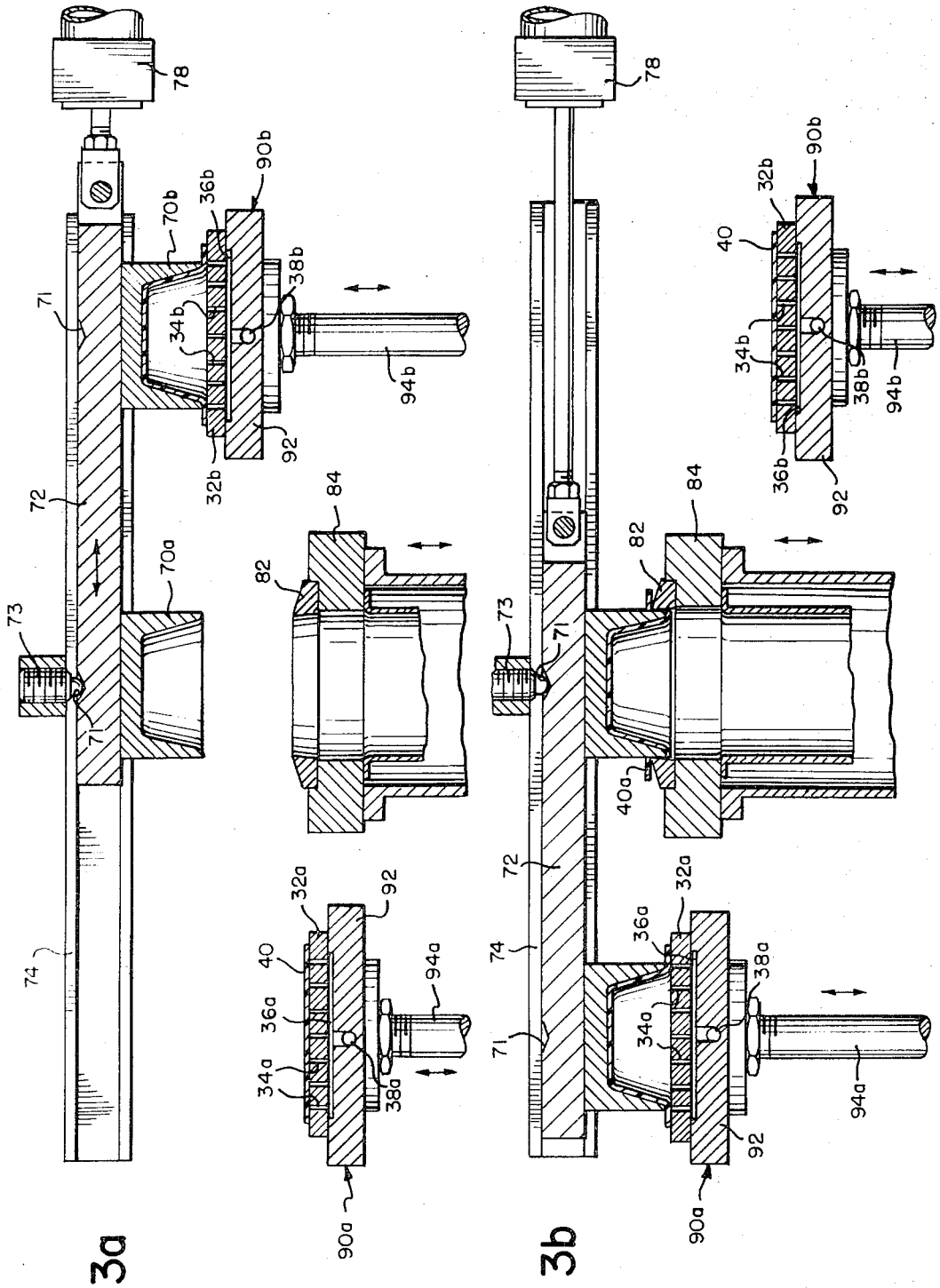

THERMOFORMING MACHINE WITH ARTICLES TRIMMED IN-PLACE

RELATED U.S. APPLICATION

This is a division of application Ser. No. 88,805, now abandoned, filed Nov. 12, 1970.

In the art of thermoforming articles of plastic material, a sheet or web of the material is heated either indirectly, such as inside of an oven or by radiant heat, or by placing it on a hot metal surface (heater plate) for direct or contact heating. With respect to thermoforming processes using contact type heating, towards which the subject invention is directed, in the next step of the process the softened plastic sheet is clamped by the periphery of a mold having a femal cavity firmly to the heater plate. The heater plate generally has a plurality of perforations to facilitate removal of air trapped initially between the sheet and the plate. After a suitable period of time, the plastic sheet will have been heated to a softened condition and air is blown through the perforations in the heater plate causing the softened sheet to be forced into the female mold and, by stretching, will fill the mold. The mold is then cooled to "freeze" the formed article in the desired shape of the mold.

In the majority of conventional processes, after an article is formed in the mold as previously described, it is trimmed from the original sheet, or web, of plastic material. This usually is done in one of two ways. The first is a so-called "post trim method" in which the web is taken from the forming station to another location and positioned relative to a cutting tool, such as a matching punch and die set, which shears the article from the web. This method has the advantages of clean-cut edges for the article due to the true shearing action of the punch and die, and the possibility of stacking the articles or nesting them as they are cut and pushed, one by one, through the cutting edge of the die.

The second cutting method is a so-called "cut-in-place method" wherein a steel rule knife is mounted around the periphery of the mold. After thermoforming of the article is completed, the knife moves down around the mold and penetrates the sheet to sever the formed part from the surrounding plastic sheet. This method has an advantage of a rather low investment in equipment and registration of trimming is assured by the principle inherent in the method since the cutting knife surrounds the die.

The post trim method discussed above has a disadvantage in that it requires relatively large cost of equipment and tooling, especially in instances where multiple molds are used, for forming a plurality of articles at the same time. In addition, there is an inherent difficulty in the need to place the formed article into the trim tooling with the required positional accuracy, called registration, to assure accurate trimming of the edges.

The disadvantages of the previously discussed cut-in-place method include the fact that automatic stacking of finished articles at high speeds becomes a major problem since there is no easy way to clear the trimmed article from the machine. Further, the cut around the formed article is often quite uneven and ragged since there is no shearing action as the knife cuts against the heater plate. In addition, tool maintenance is costly, since the dies must be sharpened quite frequently to obtain even some semblance of an even trim and down time is relatively high.

The subject invention is directed to novel apparatus which obtains many of the advantages of machines used in both cut-in-place and the post trim thermoforming methods while eliminating most of the major disadvantages thereof. In accordance with the invention, novel machines are disclosed in which the article is thermoformed in a female mold after a sheet of plastic material has been softened by contact heating. The mold is then moved relative to a cutting die which mates with an edge of the mold to trim the finished plastic article with a true shearing cut to obtain smooth edges. The preferred embodiment of the invention also has a multiple mold arrangement in which one article is being formed while another is being trimmed. This greatly increases the speed of operation and efficiency of machines made in accordance with the invention. In addition an arrangement is also provided to remove the trimmed articles from the cutting die and to stock them in batches of a predetermined number.

It is therefore an object of the invention to provide a thermoforming machine in which the edges of formed articles are trimmed by shearing action while the article is still located in its mold.

An additional object is to provide thermoforming machines capable of producing a plurality of articles at the same time wherein an article is being thermoformed in a mold while another article also located in a mold is having its edges trimmed by the shearing action of a mold moving relative to a cutting die.

A further object is to provide thermoforming machines in which the edges of formed articles are trimmed by shearing action while the article is still located in its mold and in which a common heater plate shuttles between a plurality of molds.

Another object is to provide thermoforming machines in which the edges of formed articles are trimmed by shearing action while the article is still located in its mold and in which a plurality of molds operate with a single cutting die.

Still another object is to provide a thermoforming system in which a plastic article is trimmed while still being held in a mold and the articles are removed from the trimming die and stacked in batches each containing a predetermined number.

Other objects and advantages of the present invention will become more apparent upon reference to the following specification and annexed drawings in which:

FIGS. 2a and 2b are elevational views, taken partly in cross-section, of an embodiment of the invention utilizing a common heater plate for a plurality of molds;

FIGS. 3a and 3b are elevational views, taken partly in cross-section of another embodiment of the invention using a single cutting die operating with multiple molds;

Figure 1A:
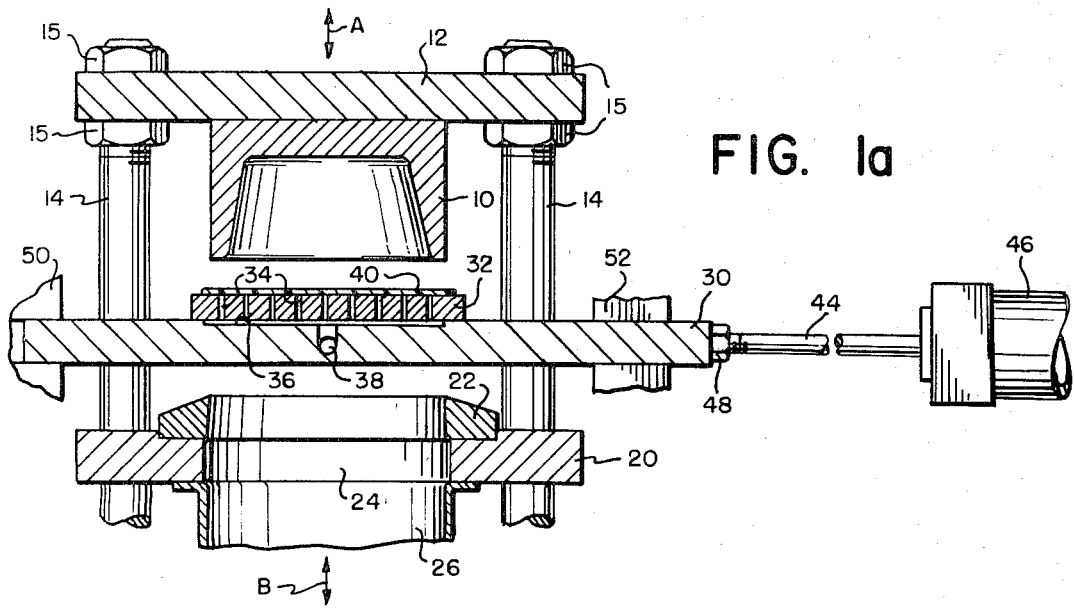
FIGS. 1a and 1b are elevational views, taken partly in cross-section, showing the principles of the subject invention in a machine illustrated in two different stages of its operation.
Figure 1B:
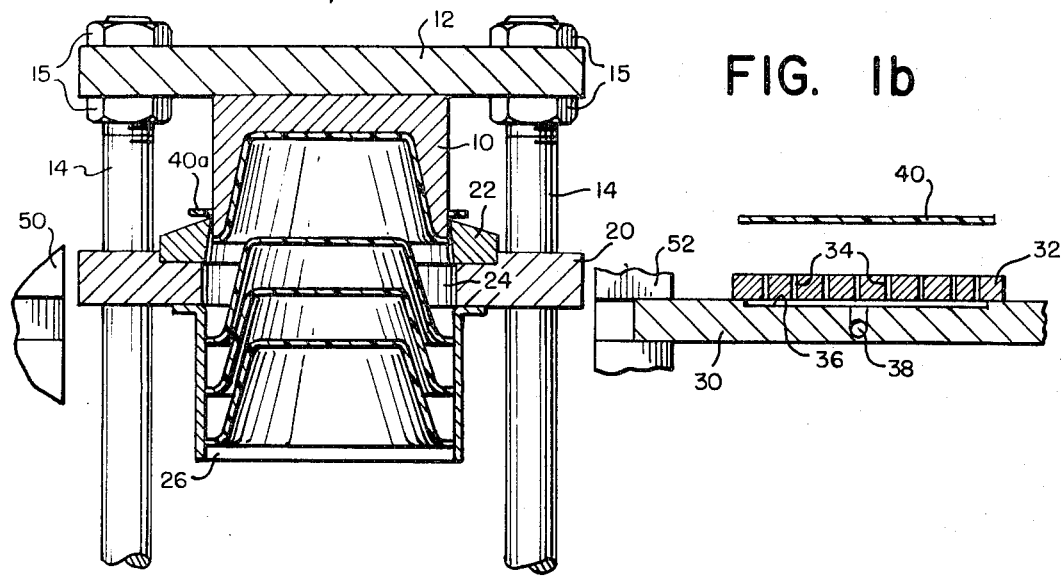

Referring to FIGS. 1a and 1b a female mold 10 is shown mounted on a top platen 12. The mold 10 has a cavity of any desired shape of the plastic article to be formed. The top platen 12 is mounted on a plurality of guide posts 14 by nuts 15. Only the rear posts 14 are shown. A lower platen 20 is also mounted on the guide posts 14 for up and down movement there along. The entire assembly of posts 14 and platens 12 and 20 are movable up and down by any suitable conventional means, not shown. Platen 20 is also individually movable up and down on posts 14 by any suitable conventional means (not shown). Both moving means are generally designated by the arrows A and B.

A hollow cutting die 22 is mounted on the lower platen 20. The inner face of die 22 conforms closely in shape to the outer periphery of mold 10 adjacent the mold cavity. The die is in line with the mold. Thus when the mold 10 moves within die 22, a close fit is obtained which cuts, by shearing action, any material located between the opposing surfaces of mold 10 and die 22 which move relative to each other. The open portion of cutting die 22 communicates with an opening 24 in the platen 20. A chute 26 is mounted on the lower face of the guide 20 to direct finished articles ejected from the molding machine into a suitable stacking station.

A shuttle platen 30 is provided which is movable transversely between the mold 10 and the die 22.

Shuttle 30 is moved by the piston 44 of a pneumatic cylinder 46 which is connected to the shuttle at 48. The shuttle moves within a pair of guide members 50 and 52.

A heater plate 32 is mounted on shuttle 30. Plate 32 has a number of air passages 34 which extend through the plate and communicate with a chamber 36 which is supplied air, or other fluid, from a conduit 38. The air source and a flexible air supply line which is connected to conduit 38 are not shown. Neither are the flexible electrical connections which are used to supply the heating current to plate 32. A piece 40 of the plastic sheet material which is to be molded is located on top of the heater block 32. This material can be any suitable plastic material, for example oriented polystyrene such as the type commonly known as OPS. The piece 40 can be fed from a roll or be part of a continuous web.

In the operation of the machine of FIG. 1, the piece of plastic material 40 is supplied to the top of the heater plate 32. The assembly of platen 12 and guide posts 14 move down so that the edges of mold 10 around the cavity clamp the piece of plastic material 40 between the mold and the top of the heater plate. This prevents the shape of the sheet from distorting after it has softened. After the sheet has softened to the required characteristics for molding, the thermoforming cycle begins and air is supplied in conduit 38 to pass through the passages 34 in the heater plate to blow the heated and softened plastic material into the cavity of mold 10. After the molding is completed the air supply is shut off and posts 14 and the platen 12 are raised separating the mold 10 from the heater plate 32. At this time cylinder 46 is actuated to move the shuttle 30 to the right to the position shown in FIG. 1b.

The next step takes place after the thermoformed article has cooled. If desired, a suitable cooling fluid can be injected into the mold to aid in the cooling of the article. The lower platen 30 is then moved toward the upper platen 12, or vice a versa. The former arrangement is shown. The lower platen reaches a position where the outer edge of mold 10 passes through the inner edge of the cutting die 22 to act as a matching punch and die set. The edge portion 40a of the article formed in the mold 10 is sheared in a clean cut from the formed article remaining in the mold. As seen in FIG. 1b, the finished article with trimmed edges is located above a stack of articles in the chute 26 which were formed during preceding molding cycles. If the finished article is not of a nature which would be self-ejecting from the mold 10, an air of mechanical assist can be provided to remove the finished article from the mold in a conventional manner.

In the next step the two platens 12 and 22 move apart to the position shown in FIG. 1a. The shuttle 30 is returned to its starting position, as shown in FIG. 1a, by the cylinder 46 and the cycle described above repeats.

The machine described in FIG. 1 has several important advantages. First of all, the thermoformed article remains inside the mold 10 until a time when it is trimmed. Therefore, absolute registration is maintained between mold 10 and the cutting die 22 since there is no horizontal movement of these two members relative to each other or the thermoformed article. In addition, since the trimming of each thermoformed plastic article is accomplished by a true shearing action between the matching punch and die set, clean cut edges are obtained. Further, the trimmed, finished articles are delivered stacked. In addition, as should be apparent, it is a relatively easy task to disassemble the die 22 from the platen to sharpen or replace it.

While the machine of FIG. 1 is operative, the time required for the molding of the articles in sequence is relatively long since the press must wait between each forming action to have the shuttle 30 moved, the trimming to take place, and the return of the shuttle. FIGS. 2a, 2b show another machine for increasing the speed of the molding and trimming operation. Similar parts are designated with the same reference numbers used in FIG. 1. The suffix letters a and b are used to designate the two different mold and cutting systems which are to be described.

A single top platen 12 is provided having a pair of female molds 10a and 10b affixed thereto. The top platen 12 is attached to two pairs of support post 14a and 14b by nuts 15 and the entire assembly is movable up and down by any suitable means. A platen 20a rides on support posts 14a and a similar platen 20b rides on the support posts 14b. Each of the platens 20 has a cutting die 22 on its top surface, a through hold 24 and a chute 26.

A single shuttle 60 is provided having the heater plate 32 thereon. Again, the electrical and air connections for the heater plate are not shown since they are conventional. The shuttle is movable on guides 75, 76, 77 between the matching mold and die sets 10a, 22a and 10b, 22b by a pair of double acting pneumatic cylinders 66 and 68. The lower surface of shuttle 60 has notches 70 and 72 which cooperate with a spring loaded detent 74 mounted on guide 76 to stop the shuttle in one of two pre-determined positions.

The operation of the machine of FIGS. 2a – 2b is as follows. At the time of the cycle shown in FIG. 2a the upper platen 12 carrying the molds 10a and 10b is at its highest position relative to the shuttle 60. The post assembly 14 and platen 12 are moved downwardly to clamp the piece of plastic material on plate 32 between the plate and mold 10a. Platen 20b carrying die 22b is moved upwardly to trim the article in mold 10b. The trimmed article moves into chute 26b. Air is then supplied to the heater plate to blow the softened plastic material into mold 10a. While the molding action is taking place in mold 10a, the lower platen 20b is moved downwardly after the article has been ejected from the mold 10b. This clears the area between the mold 10b and die 22b.

The post assembly and upper platen 12 are raised slightly to separate mold 10a, which has a molded article, from heater plate 32. Cylinder 66 is now actuated and shuttle 60 is moved to the right until detent 74 catches in groove 70 and the shuttle plate 60 is under mold 10b. The piston of cylinder 66 withdraws immediately. Additional sheet material is fed to the heater plate 32 under mold 10b. The post assembly and top platen 12 are moved down to clamp the sheet material between the heater plate and the mold 10b. Air is supplied to the heater plate to blow the plastic material into the cavity of mold 10b. At the same time, lower platen 20a is moved upwardly toward mold 10a to trim the article in mold 10a. The post assembly and upper platen 12 are moved upwardly to separate mold 10b from the heater and lower platen 10a is moved downwardly. Cylinder 68 is now actuated to move shuttle 60 between mold 10a and die 22a. The piston cylinder 68 immediately withdraws and the cycle previously described commences again.

The machine of FIG. 2 uses a double acting heater plate which shuttles between the two molds 10a and 10b. As in FIG. 1, there is perfect registration of the article in each mold during trimming. Also, the machine is highly efficient as compared to the machine of FIG. 1 since on article is being formed while another is being trimmed.

FIGS. 3a and 3b show another embodiment of the invention using single cutting die operating with two molds which permits stacking of the articles in a single stack. In this embodiment a pair of female molds 70a and 70b are mounted on an arm 72 which travels within a channel track 74 under the control of a pneumatic cylinder 78. A cutting die 82 is mounted on a platen 84 which is located between a pair of heater plate assemblies 90a and 90b. Platen 84 is movable vertically as shown by the arrows. Each of the heater plate assemblies 90 has a heater plate 32 and the necessary air and electrical connections. The heater plate 32 of each assembly 90 is mounted on a base 92 which is in turn mounted on top of an arm 94. The arm is moved upwardly and downwardly in a suitably timed relationship by a suitable means such as a cylinder, rack and pinion, etc. (not shown).

Considering now the operation of the system, in FIG. 3a the heater plate 32b is raised upwardly by its respective arm 94b. In this position mold 70b clamps a piece of plastic material on the heater plate 32b and the article is formed. At this time, mold 70a is located directly above the cutting die 82 by the arm 72 and cylinder 78. The arm 72 is locked in position, by a detent 73 latched in one of two grooves 71 in the arm 72, to secure registration between mold 10a and die 82. It is assumed that the cutting die 82 has already been moved to its down position after cutting and trimming an article which previously was located in the mold 70a.

After the molding operation shown in FIG. 3a for mold 70b is completed, the heater plate assembly 90b is moved down clearing mold 70b for horizontal movement. At this time, cylinder 78 is actuated moving arm 72 and both molds to the left so that mold 70a is located above heater plate assembly 90a and mold 70b is located in registration with cutting die 82 by the detent. The cutting die 82 is raised to trim the article which is held in mold 70a and the trimmed article is ejected into the chute. This is shown in FIG. 3b. The cutting die 82 is moved down to clear mold 10b after the trimming has been completed.

At the start of the trimming of the article in mold 10b, the piece of material on the plate 32a of heating assembly 90a is raised by arm 94a to bring it into clamping relationship with mold 70a to commence the molding process. This is also shown in FIG. 3b. When the molding process is completed in mold 70a, arm 94a is lowered, and the mold assembly arm 72 is moved to the right by the cylinder 78 to the position shown in FIG. 3a. The cutting die 82 is raised to trim the article in mold 70a and heater assembly 90b is raised to clamp the plastic material on heater plate 32b under mold 10b. The cycle described continues respectively.

As should be apparent, the embodiment of FIG. 3 is efficient since one article is being molded at the same time another is being trimmed. In addition, all of the articles formed by a pair of molds are delivered from one chute in a single stack.

In all of the embodiments of the invention disclosed the means for moving the various platens, cutting dies and heater plate assemblies are conventional and are operated in the proper time sequence. Since all of these features are well known to those skilled in the art, they need not be described in detail.

While the embodiments of FIGS. 2 and 3 show only two dies, it should be understood that the disclosed arrangement can be repeated. For example, in FIG. 2 there can be a plurality of molds 10a and 10b stacked one behind the other in line and attached to the common platen 12. The shuttle 60 would be elongated and carry a plurality of heater plates, stacked one behind the other, each heater plate operating with a pair of molds. Elongated platens 20a and 20b also would be provided each carrying a plurality of cutting dies 24, one for each mold 10a and 10b.

In the embodiment of FIG. 3, a plurality of heater plate assemblies 90a and 90b and dies 82 can be stacked in-line. A plurality of arms 72 also would be provided, each of which would carry two molds 70a and 70b to operate with a respective cutting die and two heater plate assemblies. As another alternative, the machine can be expanded parallel to the axis of travel of an arm 72. That is, for example, several sets of molds can be attached to one arm 72. Each set of molds would operate with its own cutting die and pair of heater plate assemblies as the arm is reciprocated. The latter arrangement also can be used with the stacked mold configuration previously described.

Figure 4:
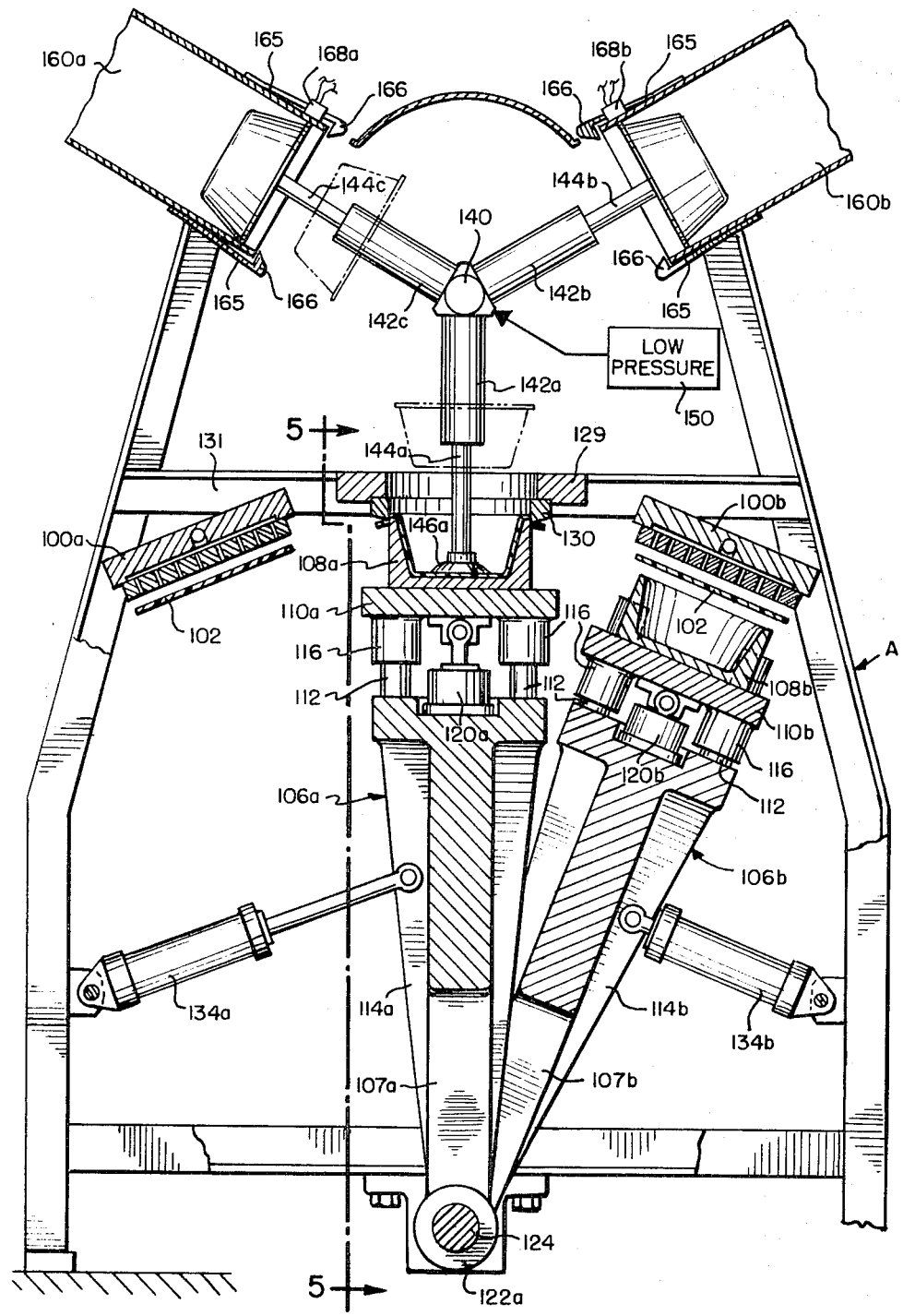
FIG. 4 is an elevational view, taken partly in section, of another embodiment of the invention showing the batching arrangement.
Figure 5:
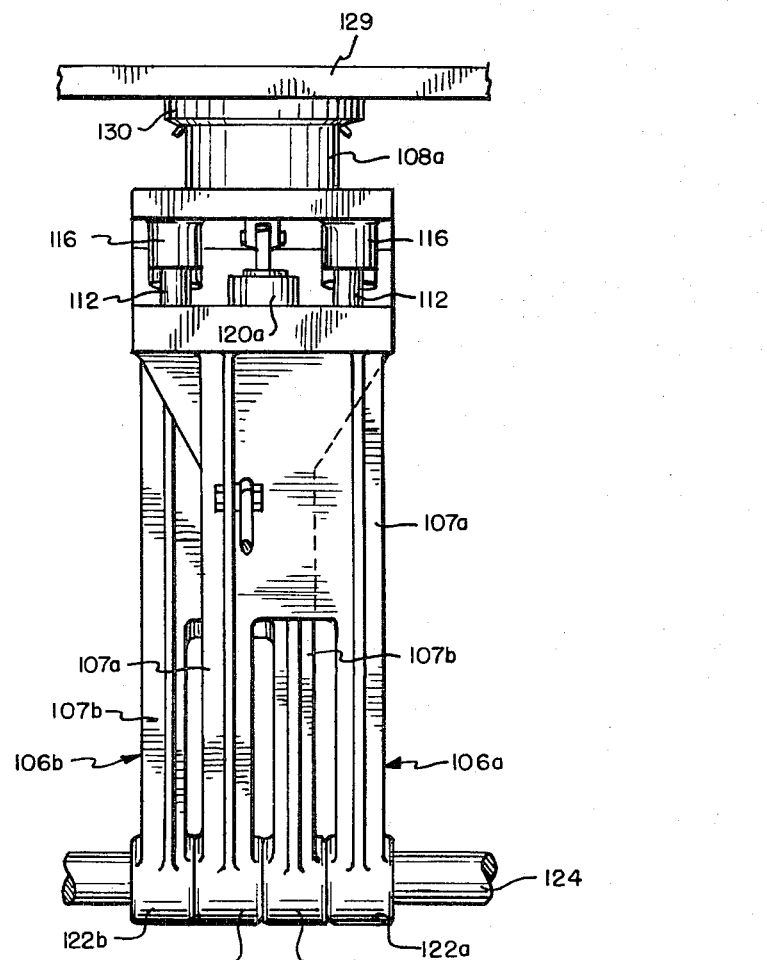
FIG. 5 is a side view of a portion of the molding apparatus of FIG. 4 looking in the direction of lines 5—5 of FIG. 4.

FIGS. 4 and 5 show another embodiment of the invention in which provision is also made for batching trimmed articles in groups containing a predetermined number of articles. The molding and trimming arrangement is similar in some respects to that shown in FIGS. 3a and 3b. Here, a pair of stationary heater plates 100a and 100b are used in the manner previously described to receive the sheet plastic material 102 which can come from a suitable supply source. The material can be supplied through suitable guide channels (not shown) adjacent a heater plate to hold the plastic material to the respective heater plate. The plates are mounted to a suitable portion of the framework generally designated A. A trimming die 130 is held on a ring 129 mounted to a cross bracket 131 of the frame. The heater plates 100a and 100b are mounted on the periphery of an arc of a circle.

A pair of mold-moving carriages 106a and 106b are provided, each of which has a respective female mold 108 mounted on a platen 110. Each platen 110 is in turn mounted on a plurality of posts 112 whose lower ends are fixed to a carriage base 114. The posts 112 travel within bearing collars 116 which are mounted to the lower face of the platen 110. An actuator device 120 of any suitable type, for example, a pneumatic cylinder or an electric motor with worm drive, is mounted between the top of a carriage base 114 and the bottom of the platen 110. Each device 120 moves its connected platen 110 and die 108 between a first position (shown at carriage 106b) and a second position (shown at carriage 106a).

The bases of the two carriages 106a and 106b have tapering legs 107. As seen best in FIG. 5, these are formed at the bottom with cylindrical bearing members 122 which are mounted on a shaft 124. Each carriage 106 has a pair of legs and the legs are shaped and interleaved so that the two carriages can swing on the common shaft 124. It is preferred that the carriages and the molding units thereon have mirror-image symmetry so that by turning one 180° it will have the same position for its legs 107 as the other carriage has. This aids in reducing the manufacturing cost since only one type of carriage and unit has to be manufactured.

The shaft 124 is mounted to the lower cross member of frame A so that the carriages 106 can be moved arcuately between two positions, one with a mold 108 in line with a respective heater plate 100 and the second with the mold in line with the trimming die 130. A respective prime mover, such as a pneumatic cylinder 134, is connected between the frame upright and a leg 107 of each of the carriages 106 to provide this movement.

The operation of the forming and trimming arrangement shown in FIGS. 4 and 5 is described below. Consider for example that the two carriages 106a and 106b are in the positions shown in FIG. 4. In this case female mold 108b is ready to receive the plastic material heated by plate 100b for molding. The platen moving device 120b is actuated to extend mold 108b partially to the piece of heated plastic material between mold 108b and the exposed face of heater plate 100b. The molding operation is performed as previously described.

At the same time the molding operation is taking place in mold 108b, the article already formed in mold 108a is being trimmed. This is accomplished by extending the piston of cylinder 120 to its full extent so that the formed article in mold 108a passes through the trimming die 130 and is trimmed by shearing action. The arrangement for removing the formed article from the trimming die is described in detail below.

After the formed article is removed from die 108a, both carriage units 106a and 106b are ready to be moved for the next portion of the cycle. At this time, the device 120b is actuated to retract mold 108b so that it can clear the heater plate 100b as it is moved. Similarly, device 120a is actuated to retract mold 108a to its lowest position. After this is done, both pneumatic cylinders 134a and 134b are actuated. The former has its piston arm retracted to move the carriage unit 106a in line with heater plate 100a and the latter to have its piston arm extended so that carriage 106b is moved in line with trimming die 130. After this is accomplished, the device 120b is actuated to move mold 108b upwardly so that the formed article in this mold will pass through the trimming die and be trimmed by the shearing action while still in place. At the same time, the molding operation is going on in mold 108a which is adjacent heater platen 100a. The cycle repeats itself after the trimming and removal of the article in mold 108b has been completed.

It should be understood that several mechanical modifications are available to the trim-in-place system shown in FIGS. 4 and 5. For example, the two carriages 106a and 106b can be locked together and only one cylinder 134 used to move them arcuately. This is possible if the angles of the arcs between the heater 100a and 100b and the trimming die 130 are the same. Further, the heater plates 100a and 100b can be moved relative to the molds 108 instead of the reverse, which is shown. In addition, the entire assembly can be turned upside down and still function. It also should be understood that the arrangement can be stacked with mold units 106 and trimming dies one behind the other. In this type of an arrangement all carriages 106a would be moved as one and their respective devices 120a actuated simultaneously. The same holds true for the carriages 106b.

FIG. 4 shows an arrangement for stacking the formed and trimmed articles in batches containing a predetermined number of articles. A hub 140 is mounted above cross-piece 131 and is rotated by a suitable device, such as a reversible stepping motor (not shown). The hub has three arms 142a, 142b, and 142c which are spaced radially 120° apart around the hub. Each of the arms 142 has a retractible plunger 144 mounted therein. Each plunger has a nipple 146, for example in the general shape of a suction cup, at the end thereof which is connected to vacuum from a suitable source 150 through appropriate tubing connections (not shown). The supply of vacuum is ducted through the hub 140 to the nipple tubing. The plungers 144 can be of any conventional construction, for example, the piston arm of a pneumatic cylinder, the arm of a solenoid, etc.

A pair of chutes 160a and 160b are mounted on frame A above hub 140 and are spaced 120° apart. Each chute is of a shape to accommodate the formed article. A number of spring-biased clamping fingers 165 are mounted around the input end of each chute. Each of the fingers has a hooked leading end 166. A microswitch 168 is mounted on each chute to be actuated by the placing of an article into the chute.

In operation, consider that the plungers 144 of all three arms are retracted so that they clear the chutes 160 and the mold 108 present at die 130. As a mold 108 passes through the trimming die 130 a switch (not shown) is actuated which causes plungers 144 of arms 142 to extend. As shown in FIG. 4, plunger 144 of arm 142a moves into mold 108a so that its nipple 146 contacts the article which has just been trimmed. As mold 108a is retracted, so that the formed article in mold 108b now can be brought adjacent die 130 for trimming, a switch is actuated to cause plungers 144 to retract. Due to the suction the nipple of arm 142a holds the article and removes it from mold 108 as the plunger 144a and the mold 108a move apart. The position of the article at this time is shown in dotted lines on arm 142a.

After retraction of the plungers 144, a signal is supplied to the motor to step its rotation for 120°. At this time, considering clockwise rotation of the motor and hub 140 as shown in FIG. 4, arm 142a is in line with chute 160a and the article that it holds is outside of the chute. At the same time mold 108b is located opposite the trimming die and arm 142b is in line with it. Upon upward movement of mold 108b into the trimming die, the plungers 144 are again extended. The article held by arm 142a is moved into chute 160a and moves its spring biased fingers 165 outwardly. This actuates switch 168. After the article in mold 108b is trimmed, the mold moves down and the plungers 144 are retracted. The article placed in chute 160a is held by the hook ends 166 on the fingers 165 as plunger 144a is retracted. This is made possible in any of a number of ways. For example, the spring tension of the fingers can be sufficiently great to overcome the vacuum of the nipple; a suitable valving system can be used for the tubing of the nipples; there can be a vent provision in the ductwork of the hub 140 where each arm is located adjacent a chute; or the nipples can be made somewhat leaky and vacuum applied thereto only when a nipple is located adjacent the trimming die 130 so that by the time the arm of the nipple has swung over to a chute the vacuum in the nipple will have dissipated somewhat. All of these arrangements are well within the skill of the art.

At the same time the article is placed in chute 160a by the arm 142a the trimmed article in mold 108b is removed by the nipple on arm 142b. The motor is again stepped to move hub 140 and arms 142 by 120° so that the article now held by the nipple of arm 142b is in line with chute 160a. During this time mold 108a is moved opposite the trimming die 130 and arm 142c is ready to pick up the trimmed article from this mold.

As seen, articles are successively loaded into the same chute 160 for each 120° rotation of the arms 142. Each time an article is placed into a chute 160, a signal is produced by the microswitch 168 of that one chute.

Figure 6:
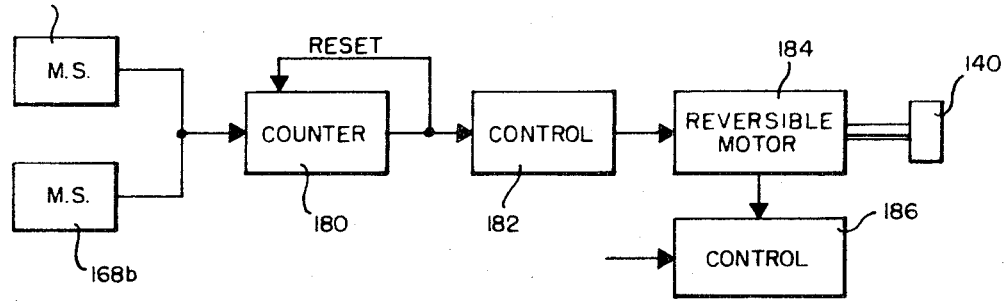
FIG. 6 is a schematic diagram of the electrical portion of the batching system.

As seen in FIG. 6, the microswitches 168 of the two chutes are connected to the input of a pre-settable counter 180 which can be of any conventional electronic or electro-mechanical type. Only one microswitch produces signals since only one chute is being loaded. Upon reaching a predetermined number, which is pre-set into the counter to be the number of articles to be in a batch, counter 180 produces an output signal which is applied to a control circuit 182 for motor 184 to reverse the direction of motor 184. This control signal can be used to reset the counter. If a counter of the automatic resetting type is used, a reset signal is not needed. Considering now that the motor is moving arms 142 counter-clockwise in FIG. 4, chute 160b will have articles successively loaded into it for each 120° rotation of the arms. During this time, the batch of articles in chute 160a can be removed. A signal is produced by switch 168b for each article to actuate counter 180. Upon reaching the pre-set number, the control signal is again produced and the direction of motor 184 reversed. The trimmed articles are now loaded into chute 160a. This reversing action of motor 184 repeats as each batch is completed. A second control circuit 186 is shown for motor 184. This receives the signal upon retraction of plungers 144 to actuate the motor to step it 120°.

As should be apparent, in the system of FIGS. 4 and 5 the articles are trimmed in place after being formed by the multiple mold arrangement cooperating with a single trimming die and are stacked in batches each having a predetermined number of articles. The stacking and batching arrangement of FIGS. 4 and 6 also can be used with the systems of FIGS. 1 and 3 in which a single trimming die is used.

What is claimed is:

1. Apparatus for forming and trimming articles made from thermo-plastic sheet material comprising, a pair of mold means each for forming a said article, at least one heater plate on which said sheet material is heated while in contact with the plate to place it in a softened condition for thermoforming, at least one cutting die having an edge shaped to mate with an edge of each mold means to permit a said mold means and die when moved relative to each other with their respective edges passing each other to make a shearing cut of any excess plastic material therebetween from the article on the mold means to trim said excess material from said article, and means for thermoforming an article at one mold means at substantially the same time that the article at the other mold means is being trimmed by said other mold means moving relative to the cutting die with the formed article thereon.

2. Apparatus as in claim 1 wherein each mold means of said pair of mold means has a respective cutting die located aligned therewith, said last named means operating to have one of said mold means thermoform an article and to move the other of said mold means relative to its respective cutting die to produce a shearing action to trim the formed article at said other mold means.

3. Apparatus as in claim 2 wherein there is a single heater plate, means for alternately moving said heater plate between each of said pair of mold means so that said heater plate is located to operate with the mold means of the pair that is thermoforming an article.

4. Apparatus as in claim 3 further comprising means for holding said heater plate as it is moved between each of two positions, one between one set of one mold means and its respective cutting die and the other between the other set of a mold means and its respective cutting die.

5. Apparatus as in claim 4 wherein each of said cutting dies has an open central portion, the article trimmed by each die from its respective mold being ejected from each die through its opening.

6. Apparatus as in claim 1 wherein there are a pair of said mold means operating with a single cutting die and further comprising means for alternately moving each of said mold means with a formed article thereon to be aligned to operate with said single cutting die.

7. Apparatus as in claim 6 wherein there are a pair of said heater plates, said moving means alternately moving one mold means to be opposite a heater plate and the other mold means to be aligned with said cutting die.

8. Apparatus as in claim 7 where said moving means comprises a reciprocating arm for each of said mold means, each of said mold means being attached to a respective reciprocating arm.

9. Apparatus as in claim 7 further comprising means for moving a heater plate toward and away from its respective mold means when a said mold means is opposite its said respective heater plate.

* * * * *